United States Patent [19]
Huber

[11] 3,795,410
[45] Mar. 5, 1974

[54] BEARER, ESPECIALLY LONGITUDINAL BEARER FOR MOTOR VEHICLES

[75] Inventor: Guntram Huber, Dachtel, Germany

[73] Assignee: Daimler-Benz AG, Stuggart, Germany

[22] Filed: May 7, 1971

[21] Appl. No.: 141,209

[30] Foreign Application Priority Data
May 8, 1970   Germany............................ 2022683

[52] U.S. Cl. ............................... 280/106 R, 293/62
[51] Int. Cl. ............................................. B62d 21/00
[58] Field of Search ........ 280/106 R, 106 T; 293/62

[56] References Cited
UNITED STATES PATENTS
2,613,986  10/1952  Heyl ............................ 280/106 R X
3,108,836  10/1963  Deckert ...................... 280/106 R X
3,131,963   5/1964  Schilberg .................... 280/106 R X
3,129,954   4/1964  Duero ............................. 280/106 R Primary Examiner—Philip Goodman
Attorney, Agent, or Firm—Craig & Antonelli

[57] ABSTRACT

A bearer, especially a longitudinal bearer for motor vehicles in which at least one step-shaped offset is provided which changes in effect the cross-sectional area thereof; the offset is thereby so constructed that in case of an impact-like load on the longitudinal bearer substantially in the direction of the longitudinal bearer axis, a folding of the individual sections of different cross-section one within the other can take place.

10 Claims, 3 Drawing Figures

PATENTED MAR 5 1974  3,795,410

INVENTOR
GUNTRAM HUBER

BY Craig, Antonelli & Hill

ATTORNEYS

BEARER, ESPECIALLY LONGITUDINAL BEARER FOR MOTOR VEHICLES

The present invention relates to a bearer consisting of sheet metal or plates, especially to a longitudinal bearer for motor vehicles.

In the construction of passenger motor vehicles, it is the universal aim to achieve as rigid as possible a center section accommodating the vehicle passenger space and front and rear sections adjoining the center section which are controllably deformable during accidents.

An aimed-at, desired deformability of the front and rear longitudinal bearers has been achieved heretofore by horizontal or vertical angular bends in the bearers. However, situations also occur in which such angular bends are not possible for space reasons or in which insufficient energy is dissipated by the deformation of such types of bearers during accidents.

The present invention is therefore concerned with the task to provide a deformable bearer which does not require more space than normal bearers used heretofore and by the deformation of which sufficient energy is dissipated in case of accidents.

Accordingly, a bearer consisting of sheet metal or plates, especially a longitudinal bearer for motor vehicles is proposed which, according to the present invention, is provided with at least one step-shaped offset, in the area of which its cross-sectional area changes, whereby this offset is so constructed that in case of a strong impact-like load occurring essentially in the direction of the bearer longitudinal axis, a folding of the individual sections of different cross section one within the other can take place.

Accordingly, it is an object of the present invention to provide a longitudinal bearer, especially a longitudinal bearer for motor vehicles which avoids by simple means the aforementioned shortcomings and drawbacks encountered in the prior art.

Another object of the present invention resides in a longitudinal bearer for motor vehicles which is capable of dissipating greater amounts of impact energy during accidents.

A still further object of the present invention resides in a bearer, especially a longitudinal bearer for motor vehicles which, with the same space requirements, increases the safey thereof.

These and further objects, features and advantages of the present invention will become more obvious from the following description when taken in connection with the accompanying drawing which shows, for purposes of illustration only, one embodiment in accordance with the present invention, and wherein.

Figure 1:
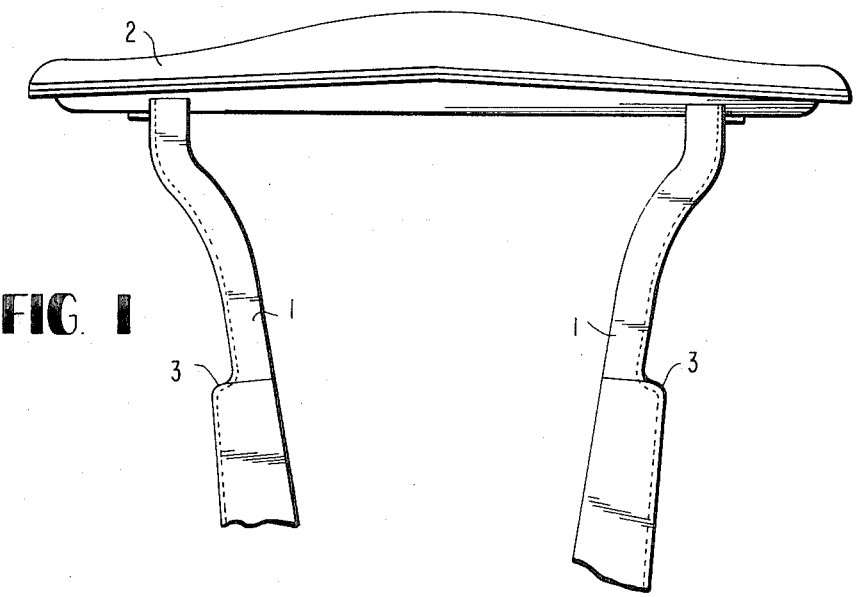
FIG. 1 is a plan view on a forward longitudinal bearer of a motor vehicle.
Figure 2:
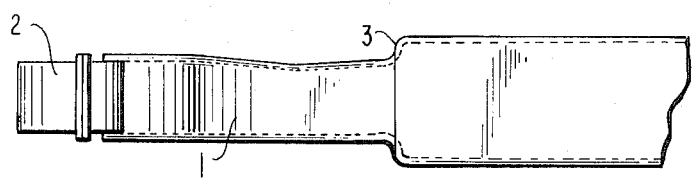
FIG. 2 is a side view, on an enlarged scale of the longitudinal bearer illustrated in FIG. 1 prior to an accident.
Figure 3:
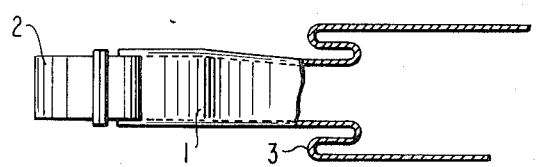
FIG. 3 is a side view similar to FIG. 2, partially in cross section, and illustrating the longitudinal bearer after an accident.

Referring now to the drawing wherein like reference numerals are used throughout the various views to designate like parts, the forward longitudinal bearer 1 of a motor vehicle illustrated in the drawing, of which one is provided on each side of the vehicle consists of an essentially U-shaped profile. The longitudinal bearers 1 are connected at their forward end with a cross bearer 2, at which the bumper of the vehicle is secured either directly or indirectly. Each longitudinal bearer 1 is provided with a step-shaped offset 3; the cross-sectional area of the longitudinal bearer 1 is reduced, as viewed in the driving direction, within the area of the step-shaped offset. This step-shaped offset 3 brings about that in case of an accident with a strong impact-like load on the longitudinal bearer 1, the portion thereof with smaller cross section is folded into the portion with larger cross section as is shown in FIG. 3 of the drawing.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A longitudinal bearer member for a motor vehicle comprising: a first longitudinal bearer member portion having a first cross-sectional area, a second longitudinal bearer member portion having a second cross-sectional area larger than said first cross-sectional area, and a third longitudinal bearer member portion interconnecting said first and second bearer member portions to one another, said first, second, and third bearer member portions being constructed in substantial longitudinal alignment with one another, said third bearer member portion forming a step-shaped offset with a resultant bending moment arm between said first and second bearer member portions such that a predetermined longitudinal force on said bearer member causes plastic deformation of said third bearer member portion and consequent movement of said first bearer member portion into said second bearer member portion such that said first cross-sectional area is disposed within the confines of said second cross-sectional area, said third bearer member portion being folded back upon itself by said predetermined force to accommodate the relative movement of said first and second bearer member portions while maintaining the interconnection of said first and second bearer member portions, whereby dissipation of longitudinally directed collision forces is obtained by deformation of said bearer member without utilizing a cross-sectional area greater than said second cross-sectional area.

2. A bearer member according to claim 1, characterized in that said bearer member essentially consists of sheet metal.

3. A bearer member according to claim 1, characterized in that said bearer member essentially consists of plates.

4. A bearer member according to claim 1, characterized in that the cross section of the bearer member decreases from the vehicle center section toward a respective vehicle end within the area of said offset.

5. A bearer member according to claim 1, wherein each of said first, second and third bearer member portions have a U-shaped cross-sectional profile.

6. A bearer member according to claim 5, wherein said U-shaped profile is open in use in the direction facing the longitudinal centerline of a vehicle.

7. A bearer member according to claim 6, wherein said second bearer member portion is located adjacent the center portion of the vehicle, and wherein said first bearer member portion is located adjacent an end of the vehicle.

8. A bearer member according to claim 6, characterized in that the step-shaped offset providing a change in cross-section of the bearer member is provided at the side of said bearer member opposite the center of the vehicle.

9. A bearer member according to claim 8, characterized in that the cross-section of the bearer member decreases from the vehicle center section toward a respective vehicle end within the area of said offset.

10. A bearer member according to claim 1, characterized in that the step-shaped offset providing a change in cross-section of the bearer member is provided at the side of said bearer member opposite the center of the vehicle.

* * * * *